F. R. JONES.
FRICTION CLUTCH.
APPLICATION FILED APR. 29, 1907. RENEWED APR. 4, 1914.
1,118,132.
Patented Nov. 24, 1914.
5 SHEETS—SHEET 1.
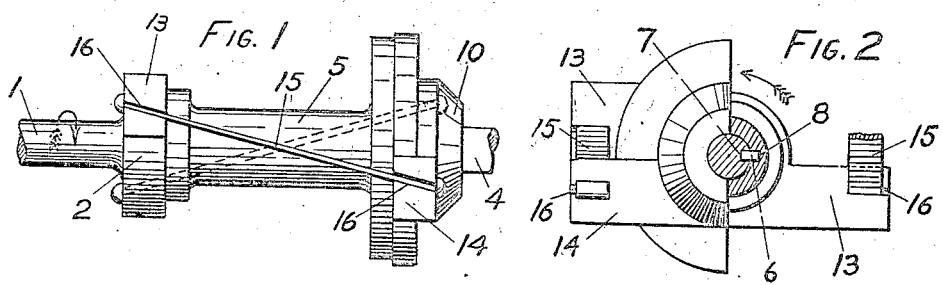
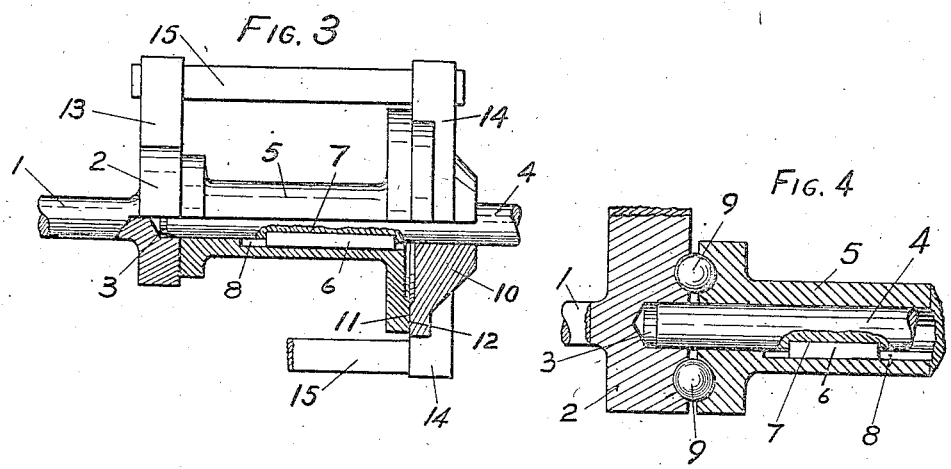
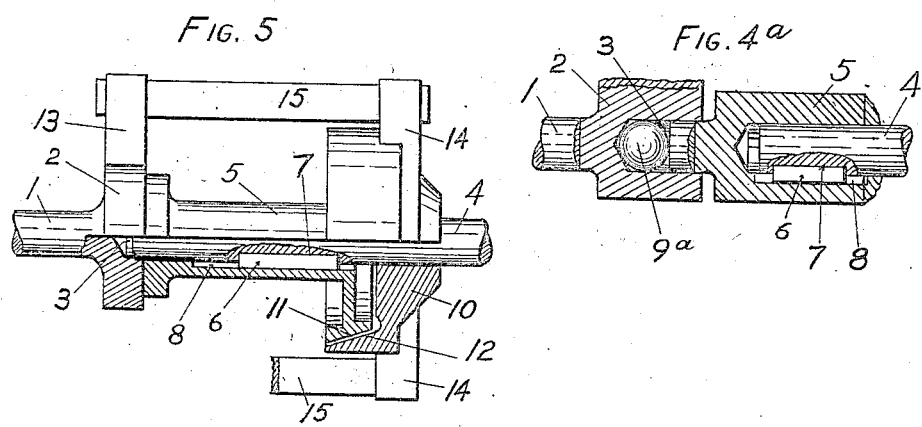
WITNESSES
Carrie A. Ivy
William Whaley.
INVENTOR
Forrest R. Jones
By Cyrus Kehr
Attorney

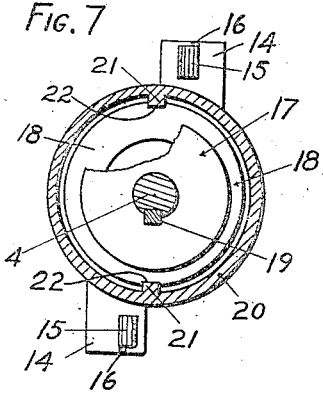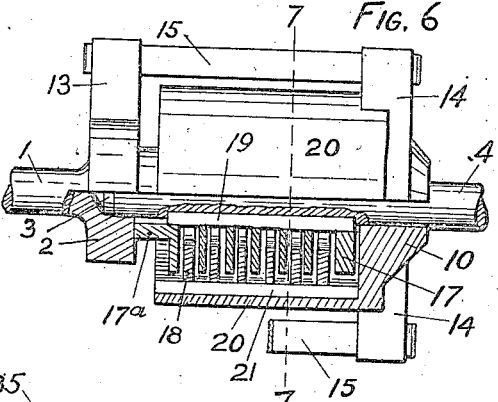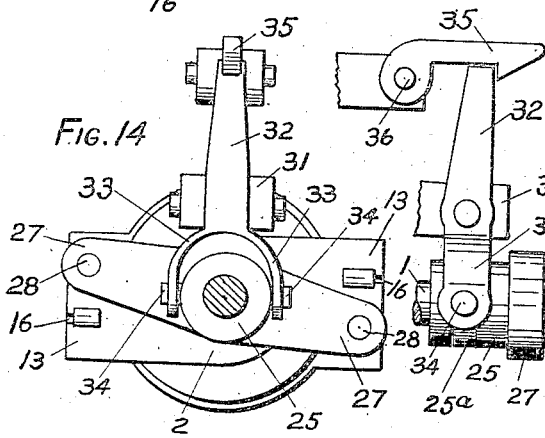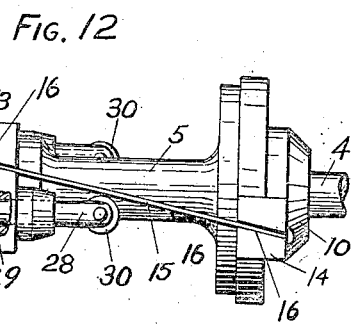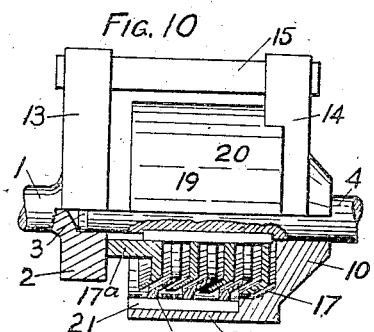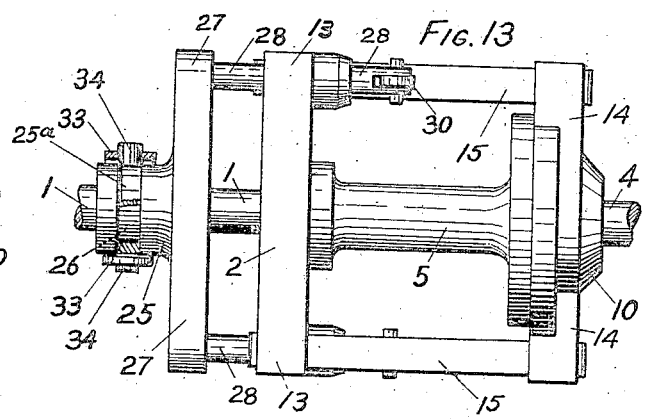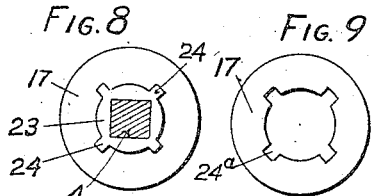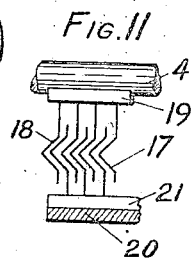

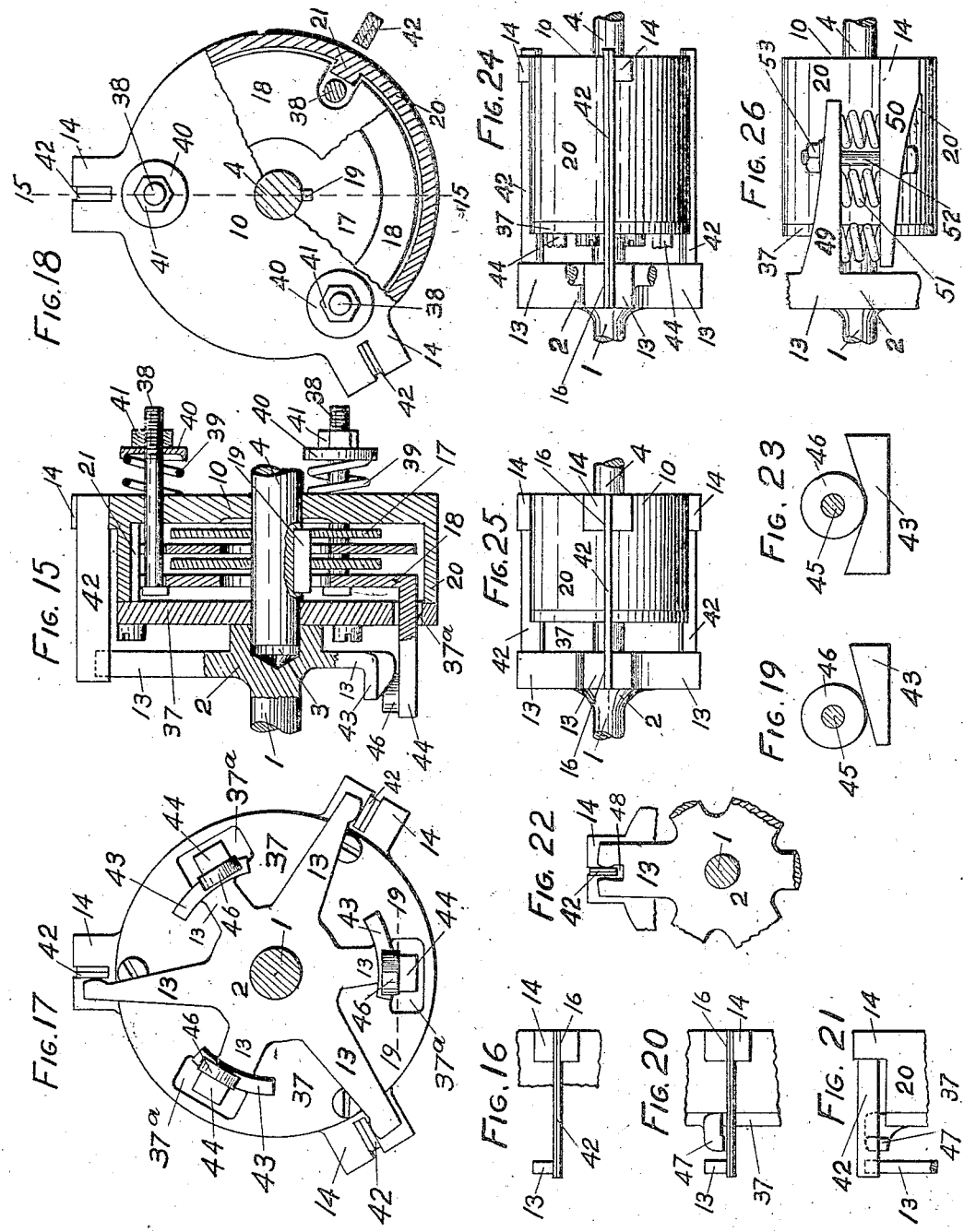

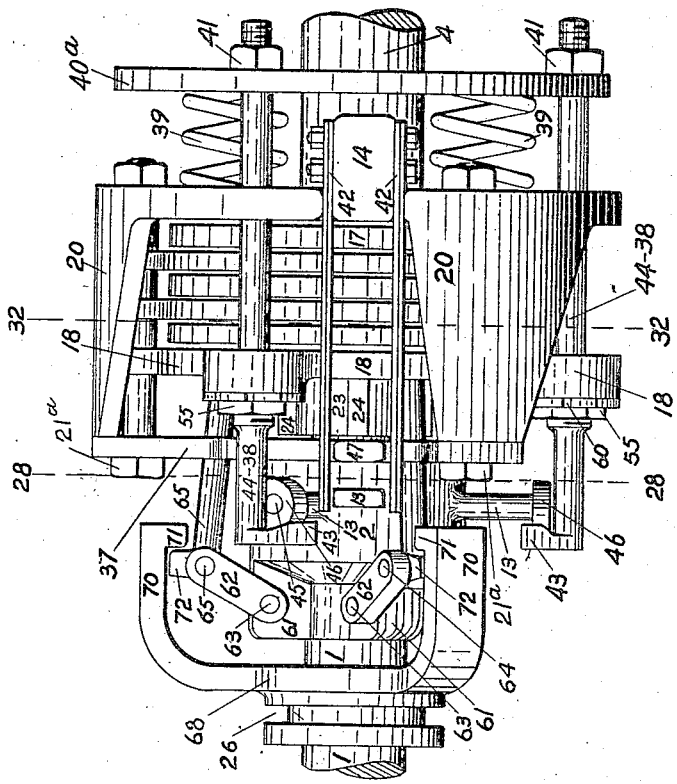

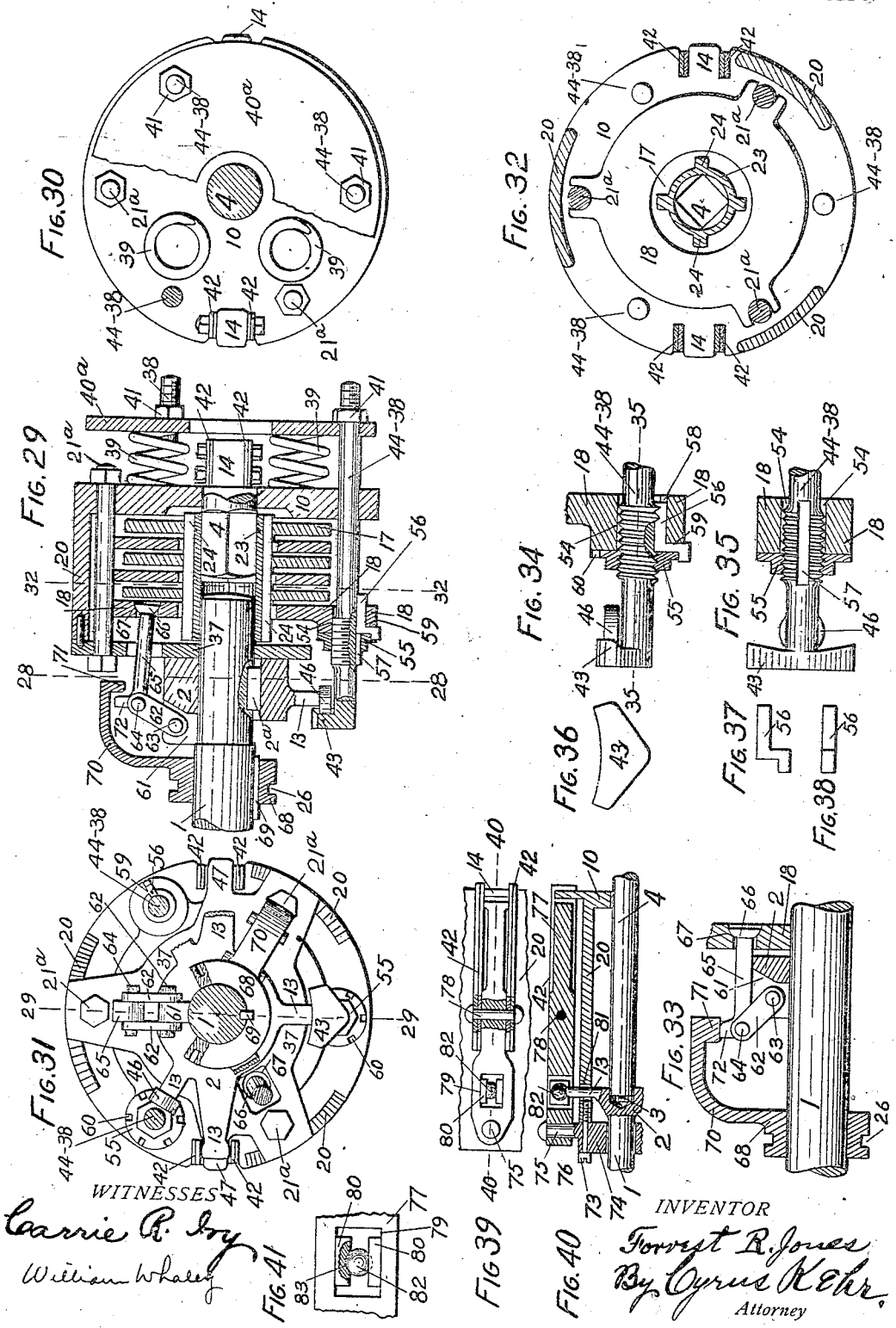

UNITED STATES PATENT OFFICE.

FORREST R. JONES, OF KNOXVILLE, TENNESSEE.

FRICTION-CLUTCH.

1,118,132.   Specification of Letters Patent.   Patented Nov. 24, 1914.

Application filed April 29, 1907, Serial No. 370,846. Renewed April 4, 1914. Serial No. 829,708.

*To all whom it may concern:*

Be it known that I, FORREST R. JONES, a citizen of the United States, residing at Knoxville, in the county of Knox and State of Tennessee, have invented a new and useful Improvement in Friction-Clutches, of which the following is a specification, reference being had to the accompanying drawing.
My improvement relates particularly to friction clutches the members of which are mounted on co-axial shafts, said members being made to engage each other frictionally by pressure on said members in lines parallel or approximately parallel to the axial line of the clutch.

The object of the invention is to provide a clutch, the members of which engage each other frictionally to a chosen maximum when the clutch is not transmitting torque—either when the entire clutch is at rest or there is no resistance to the rotation of the driven part—and which engage each other less than said maximum after the application of torque to the driving end of the clutch, in order to avoid transmission of excessive torque. In other words, the object is to produce a friction clutch which is to a considerable extent adapted to automatically and positively limit its frictional engagement with reference to a chosen maximum of power or load. It may be said that such a clutch is highly sensitive and responsive to the application of a maximum torque. And it will be observed that the frictional engagement is inverse to the torque, such engagement being reduced when the torque becomes excessive. As will be made to appear more fully hereinafter, the apparatus may be so constructed as that the frictional engagement will begin to decrease immediately upon the application of the torque, or after an arbitrarily chosen measure of torque has been applied. Or it may be said that the purpose of this arrangement is (1) to avoid applying the driving mechanism to a load too large for the strength of the driving mechanism, and (2) to gradually overcome the inertia of a load small enough for said driving mechanism, in order that the strain due to torque resistance of the driven shaft shall remain within the capacity of the driving mechanism.

The improvement is specially applicable to machinery in which power is to be frequently transmitted from parts rotating at high velocity to parts at rest—for example, to the driving mechanism of automobiles.

In the accompanying drawings, Figure 1 is a plan of a form of clutch embodying my improvement; Fig. 2 is a sectional elevation of the right hand end of the clutch as shown in Fig. 1; Fig. 3 is a sectional side elevation of the same clutch; Figs. 4 and 4ª are sectional details of modifications of the structure illustrated by Fig. 3; Fig. 5 is a sectional elevation of the clutch as shown in Fig. 3, excepting that the two right hand engaging faces of the clutch members are inclined or in the form of a truncated cone; Fig. 6 is a sectional elevation similar to Figs. 3 and 5, excepting that frictional engagement is made between a series of faces lying in planes to which the clutch axis is perpendicular; Fig. 7 is a section on the line 7—7 of Fig. 6, looking toward the right, Figs. 8 and 9 are detail views illustrating a modified construction for engaging the inner friction plates of Figs. 6 and 7 with the driven shaft; Fig. 10 illustrates a construction like that illustrated by Figs. 6 and 7, excepting that the exterior portions of the friction plates are inclined to the shaft axis and to the plane to which the shaft is perpendicular; Fig. 11 is a detail showing friction plates having annular V-shaped grooves whereby the engaging surfaces of said plates are enlarged; Fig. 12 is a plan of the form of clutch illustrated by Fig. 1, with the addition of mechanism for manually releasing the clutch; Fig. 13 is a plan of the mechanism shown by Fig. 12; Fig. 14 is an elevation of the left hand end of the clutch as shown in Fig. 12; Fig. 15 is a longitudinal sectional elevation of the form of the clutch in which the friction members are drawn toward each other by expanding coiled springs acting in lines parallel to the clutch axis, other devices being used for overcoming the action of said springs when the torque transmitted approaches or reaches the chosen maximum. Said section is taken on the line 15—15 of Fig. 18; Fig. 16 is a detail plan of the upper portion of the clutch shown in Fig. 15; Fig. 17 is an elevation of the left hand end of the clutch as shown in Fig. 15; Fig. 18 is a sectional elevation of the right hand end of the clutch as shown in Fig. 15; Fig. 19 is a section on the line 19—19 of Fig. 17, looking in the direction of the shaft; Fig. 20 is a detail plan of a portion of the clutch showing a stop applied to one of the controlling blade springs; Fig. 21 is an elevation of the same mechanism, looking rearward in Fig. 20; Fig. 22 is a detail elevation, looking toward the right in Fig. 15, of a modification whereby the apparatus is adapted to operate when rotated in either direction; Fig. 23 illustrates a modification of the structure illustrated by Fig. 19; Fig. 24 illustrates a modification of the manner of applying the springs, 15, of former figures in Figs. 15, 16, 17, and 18 (said springs being 42 in the later figures); Fig. 25 illustrates a further modification of the application of said springs, both ends of said springs being secured; Fig. 26 illustrates a further modification, coiled springs being substituted for the blade springs of the last preceding figures; Fig. 27 is a side elevation of a modification of the form of my device illustrated by Fig. 15; Fig. 28 is a section on the line 28—28 of Figs. 27 and 29; Fig. 29 is a section on the line 29—29 of Figs. 28 and 31; Fig. 30 is an elevation of the right hand end of the structure shown in Fig. 29, a portion being broken away; Fig. 31 is an elevation of the left hand end of the structure shown in Figs. 27 and 29, portions being broken away; Fig. 32 is a section on the line 32—32 of Figs. 27 and 29, looking toward the right; Fig. 33 is a sectional detail of a clutch-disengaging device; Fig. 34 is a detail section on the lower portion of the line 29—29 of Fig. 31, illustrating an adjusting mechanism; Fig. 35 is a section on the line 35—35 of Fig. 34; Fig. 36 is an elevation of the cam appearing in the adjacent portion of Fig. 34; Figs. 37 and 38 are, respectively, a side view and an edge view of a combined key and nut-lock used in the structure shown by Figs. 34 and 35; Fig. 39 is a detail plan of a modification of the yielding connection formed between the driving head and the driven member of the clutch; Fig. 40 is a section on the line 40—40 of Fig. 39; Fig. 41 is an enlarged detail of the left hand end of Fig. 39.

Referring first to Figs. 1, 2, and 3, 1 is the driving shaft having the rigid head, 2, said head having a socket, 3. Axially in line with said driving shaft, 1, is the driven shaft, 4, having its left hand end extending into said socket, 3, in the head, 2. Immediately at the right of the head, 2, a member, 5, surrounds the shaft, 4, and is secured to the latter in such manner as to preclude relative rotation between said shaft and said member but to permit longitudinal movement or sliding upon said shaft. In the form shown by said Figs. 1, 2, and 3, such engagement is made by means of a key, 6, seated in a recess, 7, in said shaft and extending loosely into a groove, 8, in the interior of the member, 5. Thus said member, 5, is adapted to be pressed endwise against the rotating head, 2, and make frictional engagement with said head, 2, said frictional engagement tending to rotate said member, and such rotation resulting in the rotation of the shaft, 4. But, for the purposes of my improvement, said member, 5, is preferably so formed as to make a relatively small frictional engagement with either said head, 2, or the member, 10. The drawings show the former. In fact, said engagement may be reduced substantially to zero by the reduction of the contact of one end of said member or by the interposition of anti-friction rollers, 9, as shown in Fig. 4, or a single ball, 9ª, as shown in Fig. 4ª.

At the right of the member, 5, another friction member, 10, surrounds the driven shaft, 4, without the interposition of a key or equivalent means for preventing the rotation of said member independently of the rotation of the shaft. And said member, 5, is provided with a relatively large frictional face, 11, and said member, 10, is provided with a corresponding frictional face, 12, said faces being in planes to which the axis of said shaft, 4, is perpendicular, and said faces being adapted to engage each other when said member, 10, is drawn or pressed toward the left.

The frictional engagement between the member, 5, and the head, 2, being less than the frictional engagement between said member, 5, and the member, 10, it follows that the torque resistance is less at the left hand or driving end of the member, 5, than at the right hand or driven end of said member, and the object in providing such unequal frictional engagements is to produce such difference in torque resistance; and, as will appear more fully hereinafter, this is desirable to make my improvement most effective. And to provide for the most sensitive control or regulation, the torque resistance at the left hand or driving end of the member, 5, should be reduced to a minimum, so that the head, 2, will serve merely as an abutment for the member, 5.

On the head, 2, are two arms, 13, said arms being located at opposite sides of and approximately perpendicular to the axis of said head; and on the member, 10, are two similar arms, 14. But the arms, 13 and 14, at the same side of the axial line of the clutch do not stand opposite each other. On the contrary, a line drawn from one to the other is diagonal to said axial line, and a line drawn from the arm, 13, to the arm, 14, on one side of said axial line is also oblique to and crosses a line extending from the arm, 13, to the arm, 14, at the opposite side of said axial line.

From each arm, 13, to the adjacent arm, 14, extends a blade spring, 15, the ends of said spring being in any suitable manner firmly secured to the adjacent arm. In the form shown by the drawings, the springs rest in slots, 16. With reference to the clutch considered as a whole, the left hand ends of said springs are fixed, while the right hand ends may be shifted laterally by bending or flexing the springs, which action will cause the member, 10, to rotate proportional to such bending or flexing of the springs, said member being, as above stated, free to rotate on the shaft, 4.

The relative dimensions and arrangement of the parts are such as that the member, 10, is normally held or drawn against the member, 5, with sufficient force to produce a frictional engagement or torque resistance between the meeting faces of said member, 10, and the member, 5, greater than is desired for operation. Torque being then applied to the shaft, 1, and head, 2, in the direction indicated by the arrow in Figs. 1 and 2 (contra-clockwise as viewed in Fig. 2), the angle of the springs, 15, to the axial line of the clutch is progressively (and minutely) reduced, whereby the distance between the head, 2, and the member, 10, is increased, or allowed to increase, or said member is drawn less forcibly toward the head, 2, whereby the frictional engagement between the member, 10, and the member, 5, is positively reduced. And it is to be observed that such reduction of such frictional engagement is gradual or progressive. It is also to be observed that the bending or flexing of the springs, 15, when torque is applied to the shaft, 1, depends upon the torque resistance offered by the shaft, 4; that the rotation of the member, 2, which carries the left hand ends of the springs, 15, is resisted by the member, 5, and the rotation of the member, 5, is resisted by the shaft, 4.

In the form illustrated by Fig. 5, the construction is the same in all respects as in Fig. 2, excepting that the face, 11, of the member, 5, and the face, 12, of the member, 10, are inclined with reference to the clutch axis and with reference to a plane to which the clutch axis is perpendicular, so that said faces are conoidal.

In Figs. 6 and 7, the place of the member, 5, is taken by a series of annular plates, 17, and a series of annular plates, 18, alternating with and overlapping the plates, 17. The plates, 17, are free to slide lengthwise upon the shaft, 4, but are held against rotation upon said shaft by means of a key, 19. The annular plates, 18, are surrounded by a cylindrical shell, 20, having on its inner face longitudinal ribs, 21, extending into notches, 22, whereby said plates are permitted to slide longitudinally but are held against rotation independently of said cylindrical shell. Said shell is integral with the member, 10, and the latter is engaged by the springs, 15, as described in connection with Figs. 1, 2, and 3, so that said shell must rotate in substantial unison with the shaft, 1, and head, 2, absolute unison of such rotation being lost when there is a slight flexing of said springs, as described in connection with Figs. 1, 2, and 3. Said springs draw said member, 10, against the first annular plate, 17, and the latter bears against the first annular plate, 18, and the latter against the next annular plate, 17, and so on throughout the two series of said plates, the last plate, 17, bearing against the head, 2, by means of a sleeve, $17^a$. Said annular plates, 17, may be regarded as together constituting a multiple form of the member, 5, of Figs. 1, 3, and 5; and said annular plates, 18, may be regarded as in the nature of duplications of the member, 10.

When it is desired to provide a stronger engagement between the shaft, 4, and the annular plates, 17, while the channeling, and consequent weakening, of the shaft, 4, are at the same time avoided, the form illustrated by Figs. 8 and 9 may be used. In said form, the portion of the shaft, 4, entering the clutch is approximately square in cross-section, and surrounding said shaft is a sleeve, 23, fitted closely to said shaft and having four longitudinal radial ribs, 24, standing equi-distant from each other around said sleeve. The plates 17, are apertured centrally corresponding to the cross-section of said sleeve, notches, $24^a$, receiving the ribs, 24, and the aperture being slightly larger than the cross-section of said sleeve, in order that said plates may be free to slide longitudinally upon said sleeve. It will be observed that the relatively larger aperture in the plate, 17, as shown in Figs. 8 and 9, is not objectionable, for only the outer portion of the lateral faces of said plate make contact with the adjacent plates, 18.

The springs, 15, and the frictional member, 10, operate the same in the form shown in Figs. 6 and 7 as in the form shown in Figs. 1, 2, and 3, the bending of the springs, 15, toward a parallel with the axial line of the clutch having the effect of reducing the frictional engagement between the contacting faces of said member, 10, and the said annular plates.

The form illustrated by Fig. 10 is the same as the form illustrated by Fig. 6, excepting that the portions of the annular plates which make frictional engagement with adjacent plates or the member, 10, stand obliquely to the clutch axis and also to a plane to which said axis is perpendicular, this form, in this respect, resembling the form illustrated by Fig. 5.

In Fig. 11, the annular plates, 17 and 18, have V-shape grooves concentric with the clutch axis, the grooved portion of each plate fitting into the grooved portion of the adjoining plate.

With the clutch, made with variations as above described, may be applied mechanism for manually effecting disengagement of the friction surfaces, either totally or to such extent as to suspend rotation of the driven shaft. One form of such disengaging mechanism is shown in Figs. 12, 13, and 14. On the shaft, 1, adjacent the head, 2, is a longitudinally slidable member, 25, having an annular groove, 26, and bearing arms, 27, which stand parallel to and opposite the arms, 13, on the head, 2. From each arm, 27, a rigid arm, 28, projects toward the right approximately parallel to the clutch axis and extends through a sliding bearing, 29, in the adjacent arm, 13, and extends beyond said bearing to approximately the middle of the adjacent spring, 15, and there touches or almost touches said spring. For the purpose of reducing friction during the movement to be hereinafter described, said end of said arm is preferably provided with an anti-friction roller, 30, arranged to bear upon said spring. Upon any relatively stationary member, 31, is pivoted a lever, 32, which has arms, 33, extending to opposite sides of the groove, 26, and engaging studs, 34, on a collar, 25ᵃ, resting loosely in said groove, 26. By moving the free end of said lever toward the left, as viewed in Fig. 12, the member, 25, is forced toward the right, the arms, 28, sliding through the bearings, 29, and each roller, 30, being made to bear against the adjacent spring, 15, so that the right hand end of each such spring is moved toward a line cutting the opposite end of the spring and lying parallel to the clutch axis, whereby the friction member, 10, is moved away from the head, 2, and the engagement between said member, 10, and the member, 5, and between the latter and the head, 2, destroyed. After the clutch has been thus released, the lever, 32, may be secured in any suitable manner, as by means of a hook, 35, hinged at 36 to a relatively stationary part of the apparatus.

In the forms of the apparatus thus far described, the friction members of the clutch are drawn against each other by the loss of distance between the head, 2, and the member, 10, due to the bending or flexing of the springs 15. A form will next be described in which annular plates, 17 and 18, are drawn toward the member, 10, by means of expanding coiled springs acting in lines parallel to the clutch axis, and the action of such springs is, by means to be hereinafter described, opposed and, when the maximum torque is transmitted, overcome to such extent as to allow the friction members to slip upon each other. Said form is illustrated by Figs. 15, 16, 17, 18, and 19. In this form the driving shaft, 1, driving head, 2, cavity, 3, in the driving head, driven shaft, 4, and friction member, 10, are present as in Figs. 1, 2, and 3 and in Figs. 6 and 7, and annular friction plates, 17, and 18, surround the shaft, 4, as in Figs. 6 and 7, the plates, 17, being longitudinally slidable and non-rotatable on said shaft and the plates, 18, being surrounded by a cylindrical shell, 20, and engaged by a rib, 21, as in Figs. 6 and 7, so as to be held against rotation with reference to said shell, but permitted to slide longitudinally in said shell. But the last annular plate at the left, which is in this case a plate, 18, does not have the head, 2, for an abutment. A head, 37, extends across the left hand end of the shell, 20, and bears against the head, 2, so that said head, 2, forms an abutment for the shell, 20, and the member, 10. (Said member, 10, is held against rightward movement by means of cams, 43, and rollers, 46, described below. Three bolts, 38, placed parallel to the clutch axis and equi-distant from said axis and from each other extend loosely through the annular plates, 18, and the member, 10, and project to the right of the latter far enough to be surrounded by an expanding coiled spring, 39. At the right of said coiled spring is a washer, 40, forming an abutment for said spring and at the right of said washer is a nut, 41, for holding said washer in position. The expansive force of said springs may be varied by shifting said nut and washer upon said bolt. Said expansive force must be sufficient to draw the annular plates, 17 and 18, against each other and the right hand plate, 17, against the member, 10, with sufficient force to effect such a maximum frictional engagement as may be desired.

To oppose the coiled springs, 39, in the performance of their function of drawing the plates, 17 and 18, and the member, 10, against each other, the following devices are employed: A blade spring, 42, resembling the springs, 15, in Figs. 1, 2, and 3, is secured by its right hand end to an arm, 14, on the member, 10, and extends thence toward the left, in a direction substantially parallel to the clutch axis, into the path of the adjacent arm, 13, which, in this case, stands nearly opposite said arm, 14. The arm, 13, at the opposite side of the head, 2, is somewhat shortened and bears on its left hand face a cam, 43. From the adjacent edge of the nearest annular plate, 18, a rigid arm, 44, extends toward the left approximately parallel to the clutch axis and through an opening, 37ᵃ, in the head, 37, and beyond the adjacent end of the arm, 13, far enough to support a stud, 45, upon which rests an anti-friction roller, 46, which bears upon the face of the cam, 43, the relation of these parts being such as to normally place the lowest portion of said cam beneath said roller.

From the foregoing, it will be understood that when said cam is forced laterally so as to bring its higher part beneath the roller, 46, said roller will be forced toward the left, and, since the stud, 45, the arm, 44, and the left hand plate, 18, are rigid with each other, said stud, arm, and plate will be drawn toward the left in opposition to the coiled spring, 39, whereby the frictional engagement between the annular plates, 17 and 18, and the member, 10, will be reduced. The same result is reached if the roller, 46, is forced laterally so as to rest upon the higher portion of said cam. This can be done by a partial rotation of the member, 10 (including, of course, the cylindrical shell, 20, and the annular plates, 17 and 18). And the same result may be reached by simultaneously rotating the head, 2, in one direction and the member, 10, and its associated parts in the opposite direction.

It will be observed that (ignoring the frictional engagement between the heads, 2 and 37, and of the shaft, 4, in the socket, 3) torque is transmitted from the shaft, 1, to the member, 10, only through the blade springs, 42, and the arms, 44. The measure or degree of torque transmitted is limited to the strength of the springs, 42, plus the element of frictional resistance between the arm, 13, and the arm, 14. In the application of torque through the shaft, 1, the lateral strain upon the blade springs, 42, by the arms, 13, causes said springs to yield laterally and allow the driven portion of the clutch (the member, 10, and shell, 20) to lag with reference to the driving portion (the shaft, 1, head, 2, and arms, 13), and the arms, 44, and rollers, 46, lag in unison with the member, 10, and shell, 20, the rollers being thereby forced upon the higher portion of the cams, 43, and such action forces the adjacent plate, 18, toward the left in opposition to the coiled springs, 39, as above described.

In Figs. 20 and 21, a stop, 47, extends from the head, 37, at the side of the spring, 42, adjacent the arm, 13, toward said arm and forms an abutment to prevent movement of the free end of said spring in the direction of said arm. When such stop is used, the spring may be set to bear with any chosen degree of force against said stop, so that the spring will not yield to the arm, 13, until the load on the driven member equals the resistance to which the spring is set. The clutch illustrated by Figs. 15, 16, 17, 18, 19, 20, 21, 24, and 26, is adapted to transmit torque in only one direction—clockwise as viewed in Fig. 17; but said clutch may be so modified as to adapt it to the transmission of torque in either direction. (And it is to be observed that the member, 10, might be chosen as the driving member, in which case the direction of transmission of torque would be reversed.) Such a modification adapting the clutch to transmit torque in either direction from the head, 2, (or the member, 10) is illustrated by Figs. 22 and 23. In said figures, each arm, 13, has at its outer end a notch, 48, into which the spring, 42, extends, so that the arms, 13, will be resisted by said spring, whether said arms be moving in one direction or the other; and the cam, 43, has two high portions and an intermediate low portion, so that the roller, 46, will normally rest in said lower portion and will be forced upon a high portion when the arm, 13, bearing said cam is moved in either direction.

The form illustrated by Figs. 15, 16, 17 and 19 may also be modified by securing the springs, 42, rigidly to the adjacent arms, 13, and leaving the opposite ends of said springs in free engagement with the arms, 14, of the member, 10. Such a form is illustrated by Fig. 24.

A further modification is shown in Fig. 25, it being understood that the springs, 39, cams, 43, and rollers, 46, are to be used as in Figs. 15 and 17. In that form, the springs, 42, are secured to the arms, 13, and also to the arms, 14, in the manner illustrated for one end only in Figs. 16 and 24. In such form, the flexing of the springs, 42, upon the application of torque causes a slight drawing of the member, 10, toward the head, 2; but this is so slight in comparison with the action of the cam, 43, upon the roller, 46, as to be immaterial. And for still another form (shown in Fig. 26) each arm, 13, may have a finger, 49, extending across the perimeter of the shell, 20, toward the opposite arm, 14, and each arm, 14, may have a similar finger, 50, extending toward the opposite arm, 13, and be separated from the adjacent finger, 49, by an intervening coiled or other form of spring, 51. A bolt, 52, extends loosely through said fingers, 49 and 50, and bears at one end a nut, 53. Said bolt and nut constitute an adjustable means for limiting the distance between said fingers, for the setting of the springs to a chosen resistance and to prevent undue rotation or springing forward of the driven portion of the clutch upon a sudden removal of load.

The form illustrated by Figs. 27 to 38, inclusive, embodies several features not shown by the preceding figures. One of these is the combination of the arms, 44, of Figs. 15 and 17 with the bolts, 38, of said figures. Another of said features is mechanism for adjustably securing the arms, 44, (or the combined arms, 44, and bolts, 38) to the left hand annular plate, 18, while the right hand ends of said bolts extend through the member, 10, and an annular washer-plate, 40ª, which serves as a substitute for individual washers, 40, of preceding forms, for holding the coiled springs, 39. Another of said features is the cutting away of portions of the shell, 20, and moving the springs, 42, from the exterior of said shell into such openings. (But in the form shown in said figures only two pairs of such springs are used—not three as in the preceding figures). The purpose of this arrangement is to make the clutch more compact. Another of said features is the omission of the ribs, 21, of previous forms and using three bolts, 21ª, to bind the head, 37, to the shell, 20, and guide the annular plates, 18. Another of said features is the making of the head, 2, separate from the shaft, 1, and securing these parts immovably to each other by means of a key, 2ª. The last of said features is mechanism for either manually or automatically positively disengaging the clutch.

At opposite sides of the clutch axis are located two arms, 14, on the member, 10, but said arms extend toward the right, instead of radially, and to each side of each of said arms are bolted blade springs, 42. The opposite ends of said springs stand at opposite sides of an arm, 13, on the head, 2, and on the head, 37, a stop, 47, rises between said springs. This arrangement of said springs and stops adapts the clutch for action in either direction, as has been described in connection with Figs. 22 and 23—or either member of the clutch may be treated as the driving member—and if the clutch is to be used for operation of the shaft, 1, first in one direction and then in the other, one spring may be set for releasing under one stress and the other under a higher or lower stress.

As above indicated, the bolts, 38, and the arms, 44, are formed integral, and these combined members extend through non-threaded bearings, 54, in the left hand plate, 18, said plate being secured to said combined member so as to partake of the movement of the latter when the head, 2, turns with reference to the member, 10, shell, 20, and said plate, 18, and forces the rollers, 46, beneath the cams, 43, said rollers and said cams being transposed with reference to their positions in Figs. 15 and 17. The drawings show said combined members adjustably secured in said bearings, 54. The details for effecting such adjustment are illustrated by Figs. 34 to 38, inclusive. Each such combined member, 44—38, is screw-threaded within said bearing, 54, the bearing being large enough to permit said member to slide freely within said bearing. At the left of said bearing a nut, 55, surrounds the threaded portion of said member, 44—38, and bears against the adjacent face of said plate, 18. Said nut serves to hold said member, 44—38, against the expansive stress of the springs, 39. To prevent the rotation of the arm, 44, and the cam, 43, a key, 56, is seated in a groove, 57, in the member, 44—38, and a corresponding groove, 58, in the bearing, 54. The same key is made to serve as a lock for the nut, 55. For this purpose said key extends radially away from the member, 44—38, in a radial groove, and then extends leftward into one of several radial notches, 60, in the nut, 55. When the roller, 46, forces the member, 44—38, toward the left, the range of such movement is only sufficient to reduce pressure between the plates, 18 and 17, and the member, 10, and said plates and member are not actually separated from each other, and the nut, 55, is therefore not moved away from the adjacent plate, 18, far enough to disengage the key, 56, from said nut. In other words, said nut remains in contact with said face of said plate, 18. But when the nut, 55, is to be adjusted the member, 44—38, is forcibly moved toward the left far enough to move the nut out of engagement with the key and permit the rotation of said nut to any desired extent—from one notch to the next adjacent notch or farther. Then the member, 44—38, is allowed to be drawn toward the right until the nut is again in its normal position, the key, 56, again entering one of the notches, 60.

The mechanism for disengaging the clutch will be next described. On the left hand portion of the head, 2, are three radial and equi-distant lugs, 61; and to each side of each of said lugs is coupled a link, 62, by means of a bolt or shaft, 63. (See Figs. 27, 29 and 31.) The opposite ends of said links are coupled to the left hand end of an arm, 65, by means of a bolt or shaft, 64. The opposite end of said arm has a spheroidal head, 66, engaged in a socket, 67, in the left hand plate, 18. It will be seen that the movement of said arms, 65, toward the left will cause the movement of said annular plate, 18, toward the left so as to effect disengagement between the plates, 18 and 17, and the member, 10. For the shifting of said arms, 65, a spider, 68, surrounds the shaft, 1, at the left of the head, 2, and is secured to said shaft by a longitudinal key, 69, permitting said spider to slide longitudinally upon said shaft, but preventing rotation independently of said shaft. Each spider arm, 70, has a lug, 71, extending toward the clutch axis immediately at the right of a corresponding lug, 72, rising from the left hand end of the arm, 65. Moving said spider toward the left will cause the lugs, 71, to press against the lugs, 72, and force the latter, and the arms, 65, toward the left. The spider, 68, may be engaged by any suitable mechanism for shifting said spider longitudinally upon the shaft, as by means of such a collar, 25ª, and lever, 32, as are shown in Figs. 12 and 14. The relative proportions of the parts are such as that when the arm, 65, has been drawn to its limit to the left, the lug, 71, of the spider will slip into position upon the lug, 72; and in such position the arm, 65, is held or locked immovably. For the link, 62, then leans toward the left and is held by the lug, 71, against upward and rightward movement. Whatever form of mechanism may be used, as above suggested, to shift the spider should be adapted to secure the spider in the above-described position.

Still another form of mechanism for producing a yielding or elastic engagement between the driving and the driven portions of the clutch, tending to compel rotation of said portions in unison, is shown in Figs. 39 and 40. The cylindrical shell, 20, is extended leftward beyond the arms, 13, and the head, 2, and is secured by means of screw-bolts, 73, to a head, 74, loosely surrounding the shaft, 1. Opposite each arm, 13, said head, 74, bears a wrist-pin, 75, which is radial to the shaft, 1, and extends through a bearing, 76, in an arm, 77, which is normally parallel to the clutch axis and extends almost to the opposite arm, 14. To each side of said arm, 77, are secured blade springs, 42, by means of a rivet or bolt, 78. Said springs extend beyond the free end of said arm, 77, and the arm, 14. At the right of the wrist-pin, 75, said arm, 77, has a socket, 79, which is approximately radial to the clutch axis and has sides parallel to said axis. Within said socket and resting against said sides are slide blocks, 80. On the adjacent arm, 13, (which extends through a relatively large opening, 81, in the shell, 20) is a spherical or spheroidal head, 82, resting between said slide blocks and extending into cavities, 83. When torque is applied to the shaft, 1, the arm, 13, presses laterally on the arm, 77, tending to turn said arm on the wrist-pin, 75, and flexing the blade springs at the side of the arm, 77, from which the free end of the arm, 77, tends to move, said spring bearing against the arm adjacent the face of the arm, 14.

I claim as my invention:

1. In a friction clutch, the combination with friction members, of turning force transmitting mechanism for producing an engagement between said friction members which engagement diminishes with the increase of torque applied, substantially as described.

2. In a friction clutch, the combination with friction members, of turning force transmitting mechanism for producing a chosen maximum engagement between said members when the clutch is idle an diminished engagement when torque is applied, substantially as described.

3. In a friction clutch, the combination with friction members, of turning force transmitting mechanism for producing an engagement between said frictional members diminishing with the increase of torque applied, such diminishing being approximately proportional to the increase of torque, substantially as described.

4. In a friction clutch, the combination with friction members, of elastic turning force transmitting mechanism normally pressing said members into engagement with each other to a degree greater than required for the torque transmitted and diminishing such pressure when the maximum torque is transmitted, substantially as described.

5. In a friction clutch, the combination with friction members, of elastic turning force transmitting mechanism normally acting upon said friction members to hold them against each other with a pressure effecting an engagement between said members above a chosen maximum, said elastic mechanism being acted upon by the turning force in opposition to said action upon said friction members, so that upon the application of a chosen maximum torque the engagement of said friction members is reduced to such extent that said members slide over each other and prevent further increase of the torque transmitted, substantially as described.

6. In a friction clutch, the combination with the driving and driven frictional members, of elastic turning force transmitting mechanism acting obliquely for yieldingly engaging said frictional members, substantially as described.

7. In a friction clutch, the combination with a driving shaft, a head on said shaft, a driven shaft, a member, 5, slidable and non-rotatable upon the driven shaft, a member, 10, loosely surrounding the driven shaft, of elastic mechanism upon which the turning force acts and whose capacity for resistance to said turning force is the measure of the maximum torque that the clutch will transmit, substantially as described.

8. In a friction clutch, the combination with a driving shaft, a head on said shaft, a driven shaft, a member, 5, slidable and non-rotatable upon the driven shaft, a member, 10, loosely surrounding the driven shaft, of elastic mechanism acting obliquely for yieldingly engaging the friction members of the clutch, substantially as described.

9. In a friction clutch, the combination with a driving shaft, a head on said shaft, a driven shaft, a member, 10, a member, 5, slidable and non-rotatable upon the driven shaft, of elastic, obliquely-acting mechanism intervening between said head and said member, 10, substantially as described.

10. In a friction clutch, the combination with a driving shaft, a head on said shaft, a driven shaft, a member, 5, slidable and non-rotatable upon the driven shaft, a member, 10, loosely surrounding the driven shaft, of obliquely-acting springs intervening between said head and said member, 10, substantially as described.

11. In a friction clutch, the combination with a driving shaft, a head on said shaft, a driven shaft, a member, 5, slidable and non-rotatable upon the driven shaft, a member, 10, loosely surrounding the driven shaft, of obliquely-acting springs joined to said head and said member, 10, substantially as described.

12. In a friction clutch, the combination with a driving shaft, a head on said shaft, a driven shaft, a member, 10, loosely surrounding the driven shaft, a member, 5, slidable and non-rotatable on the driven shaft between said member, 10, and said head and arranged for making greater engagement at one end than at the other end, of elastic mechanism upon which the turning force acts and whose capacity of resistance to said turning force is the measure of the maximum torque that the clutch will transmit, substantially as described.

13. In a friction clutch, the combination with a driving shaft, a head on said shaft, a driven shaft, a member, 10, loosely surrounding the driven shaft, a member, 5, slidable and non-rotatable on the driven shaft between said member, 10, and said head and arranged for making greater frictional engagement with said member, 10, than with said head, of elastic mechanism upon which the turning force acts and whose capacity of resistance to said turning force is the measure of the maximum torque that the clutch will transmit, substantially as desired.

14. In a friction clutch, the combination with a driving shaft, a head on said shaft, a driven shaft, a member, 10, loosely surrounding the driven shaft, a member, 5, slidable and non-rotatable on the driven shaft between said member, 10, and said head and arranged for making greater engagement at one end than at the other end, of oblique springs secured to said head and said member, 10, substantially as described.

15. The combination with the friction members of a clutch, of spring-mounts and torque-transmitting springs set in said mounts to permanently press the friction members together, the increased deflection of said springs by the torque transmitted through them being such as to directly decrease the pressure between the friction members to such an extent that the friction members slip rotatively over each other while continuously transmitting a predetermined amount of torque.

16. The combination with the friction members of a clutch, of spring-mounts and torque-transmitting springs set to press the friction members together, the increased deflection of said springs by torque transmitted through them being such as to act directly on one of said spring-mounts to give the mount a compound rotative and longitudinal movement relative to the other mount to decrease the pressure between the friction members to such an extent that the friction members slip over each other while continuously transmitting a predetermined amount of torque.

17. The combination with the friction members of a clutch, of spring-mounts and blade springs set to press the friction members together, the increased deflection of said springs by torque transmitted through them being such as to act directly to give one of the spring-mounts a compound rotative and longitudinal movement relative to the other mount to decrease the pressure between the friction members to such an extent that the friction members slip over each other while continuously transmitting a predetermined amount of torque.

18. The combination with the friction members of a clutch, of a driving spring-mount, a driven spring-mount, and blade springs connecting said spring-mounts, said springs being permanently set to press the friction members together, the increased deflection of said springs by torque transmitted through them being such as to directly move one spring-mount relative to the other to decrease the pressure between the friction members to such an extent that the friction members slip over each other while continuously transmitting a predetermined amount of torque.

19. The combination with the friction members of a clutch, of elastic mechanism which presses the friction members together and also transmits torque in such a manner that the increased deflection of said elastic mechanism due to the transmitted torque directly and positively reduces the pressure between the friction members to such an extent that the friction members slip over each other while continuously transmitting a predetermined amount of torque.

20. The combination with the friction members of a clutch, of elastic mechanism which presses the friction members together and also transmits and is deflected by the torque, said deflection being such as to directly and positively reduce the pressure between the friction members to such an extent that the friction members slip over each other while continuously transmitting a predetermined amount of torque, and of means for disengaging said friction members.

In testimony whereof I have signed my name, in presence of two witnesses, this 25th day of April, in the year one thousand nine hundred and seven.

FORREST R. JONES.

Witnesses:
 EDWARD HACKER,
 CYRUS KEHR.